Figure 1:
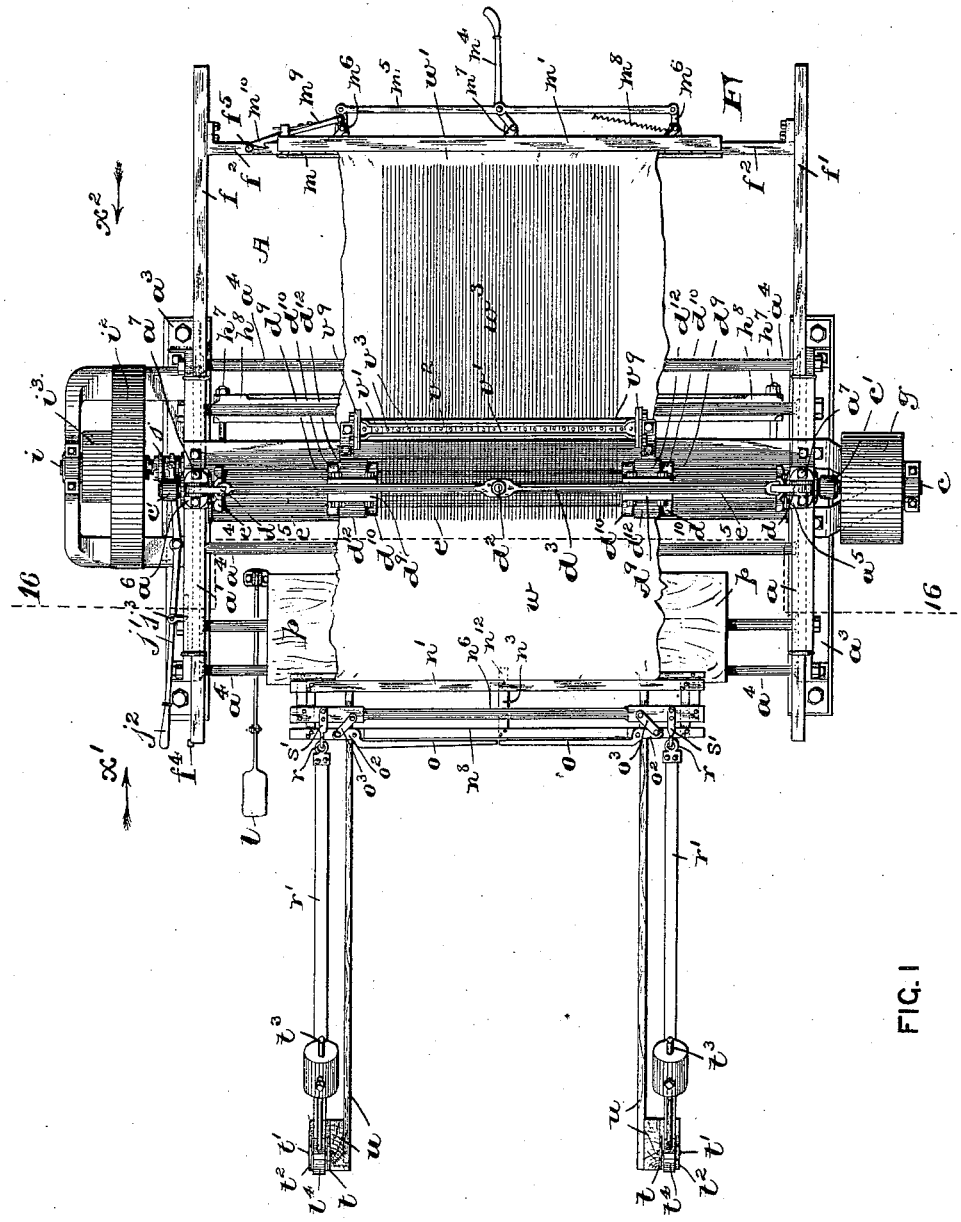

(No Model.) 6 Sheets—Sheet 1.

P. GOLDSTEIN & G. ANDRAE.
MACHINE FOR CUTTING LACES.

No. 567,131. Patented Sept. 8, 1896.

WITNESSES:

INVENTORS:
Philip Goldstein
and
Gustav Andrae,
BY
Fred'k C. Fraentzel,
ATTORNEY (No Model.) 6 Sheets—Sheet 2.

P. GOLDSTEIN & G. ANDRAE.
MACHINE FOR CUTTING LACES.

No. 567,131. Patented Sept. 8, 1896.

WITNESSES:

INVENTORS:
Philip Goldstein
and
Gustav Andrae,
BY
Fred C. Fraentzel,
ATTORNEY (No Model.) 6 Sheets—Sheet 3.

P. GOLDSTEIN & G. ANDRAE.
MACHINE FOR CUTTING LACES.

No. 567,131. Patented Sept. 8, 1896.

WITNESSES:

INVENTORS:
Philip Goldstein
and
Gustav Andrae,
BY
Fred C. Fraentzel,
ATTORNEY (No Model.) 6 Sheets—Sheet 4.

P. GOLDSTEIN & G. ANDRAE.
MACHINE FOR CUTTING LACES.

No. 567,131. Patented Sept. 8, 1896.

WITNESSES:
W. B. Fraentzel.
Wm. H. Caufield Jr.

INVENTORS:
Philip Goldstein
and
Gustav Andrae,
BY
Fred'k C. Fraentzel,
ATTORNEY (No Model.) 6 Sheets—Sheet 5.

P. GOLDSTEIN & G. ANDRAE.
MACHINE FOR CUTTING LACES.

No. 567,131. Patented Sept. 8, 1896.

WITNESSES:
W. B. Fraentzel.
Wm. H. Campfield Jr.

INVENTORS:
Philip Goldstein
and
Gustav Andrae,
BY
Fred C. Fraentzel,
ATTORNEY (No Model.) 6 Sheets—Sheet 6.

P. GOLDSTEIN & G. ANDRAE.
MACHINE FOR CUTTING LACES.

No. 567,131. Patented Sept. 8, 1896.

WITNESSES:

INVENTORS:
Philip Goldstein,
and
Gustav Andrae,
BY
Fred F. C. Fraentzel,
ATTORNEY

UNITED STATES PATENT OFFICE.

PHILIP GOLDSTEIN AND GUSTAV ANDRAE, OF NEWARK, NEW JERSEY; SAID ANDRAE ASSIGNOR TO SAID GOLDSTEIN.

MACHINE FOR CUTTING LACES.

SPECIFICATION forming part of Letters Patent No. 567,131, dated September 8, 1896.

Application filed December 6, 1895. Serial No. 571,254. (No model.)

*To all whom it may concern:*

Be it known that we, PHILIP GOLDSTEIN and GUSTAV ANDRAE, citizens of the United States, residing at Newark, in the county of Essex and State of New Jersey, have invented certain new and useful Improvements in Machines for Cutting Laces and the Like; and we do hereby declare the following to be a full, clear, and exact description of the invention, such as will enable others skilled in the art to which it appertains to make and use the same, reference being had to the accompanying drawings, and to letters of reference marked thereon, which form a part of this specification.

Our present invention has reference to a novel construction of machine for the cutting of hides or skins or other suitable material into strips or laces, and especially leather shoe-laces; and the primary object of this invention is to construct a simple, effective, and rapidly-working machine in which the skin or hide or other material to be cut can be readily mounted and cut into long and narrow strips or laces of a uniform width, avoiding any undue waste and extra handling, and such cut strips or laces all being attached to a heading at one end and dangling therefrom. This is a very essential feature, for previous to coloring the edges of the laces it allows of the folding of the heading at the top in such a manner that the narrow edges of the laces dangling therefrom will all be in proper position for readily coloring the same by hand or by machinery.

To this end the invention consists in the novel form and construction of machine for the purposes hereinabove stated, and also in the novel arrangements and combinations of parts and minor details of construction, such as will be hereinafter fully set forth, and finally embodied in the clauses of the claim.

An operative machine constructed in accordance with this invention is illustrated in the accompanying drawings, in which—

Figure 2:
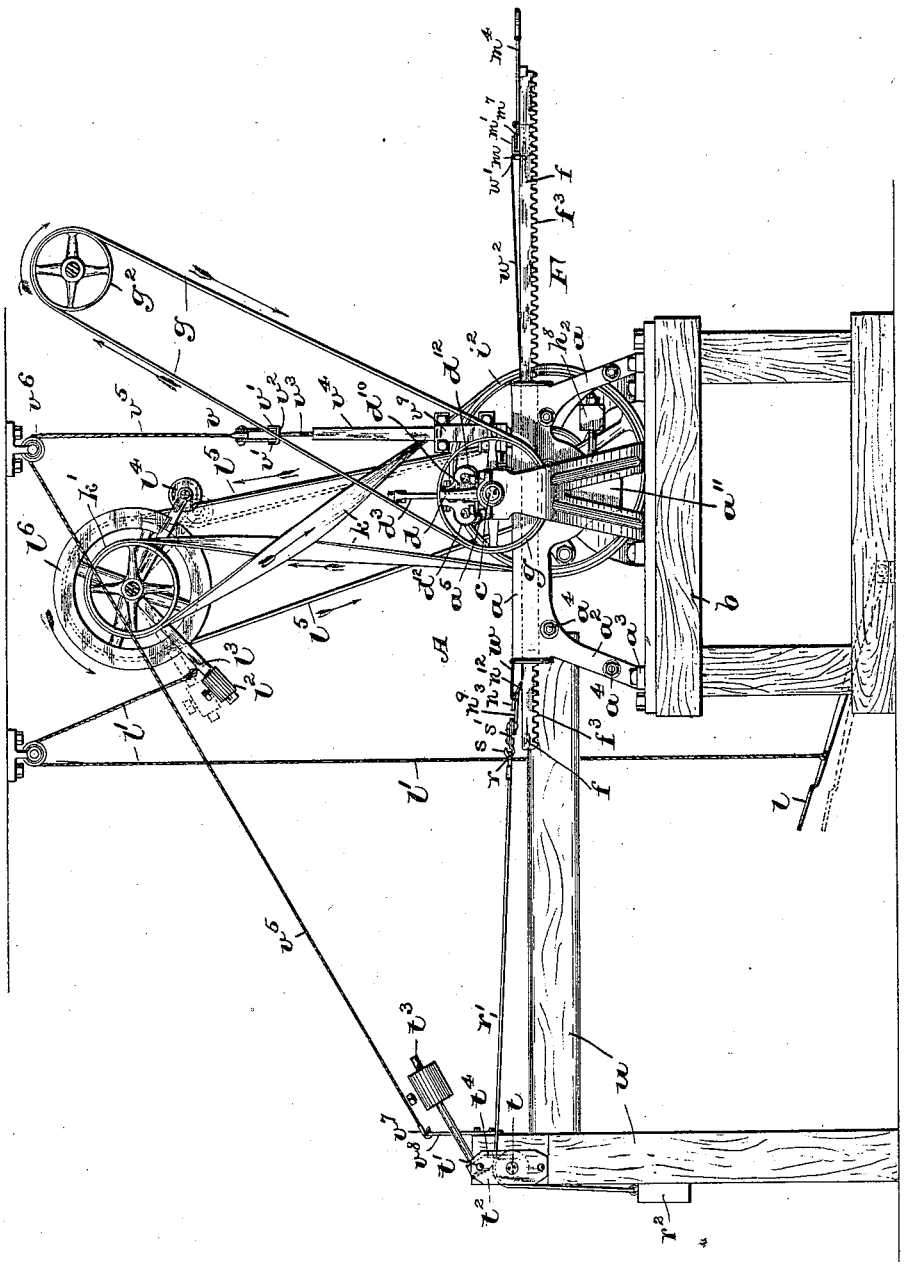
Figure 3:
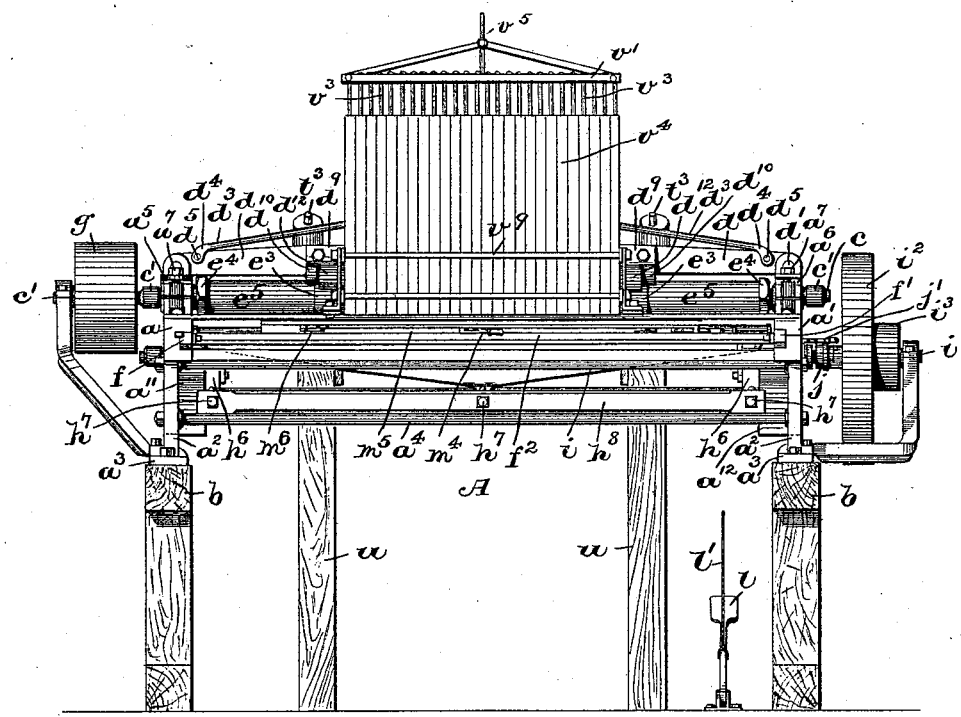
Figure 4:
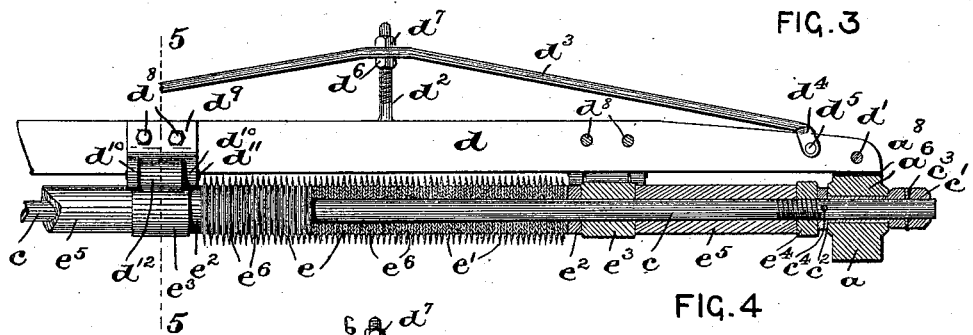
Figure 5:
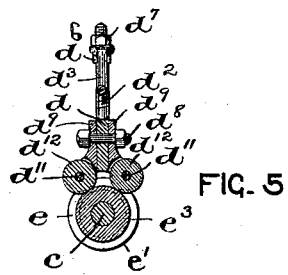
Figure 6:
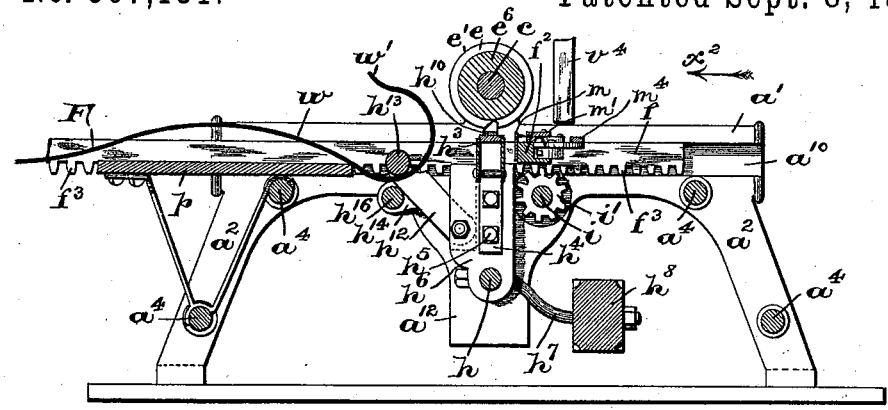
Figure 7:
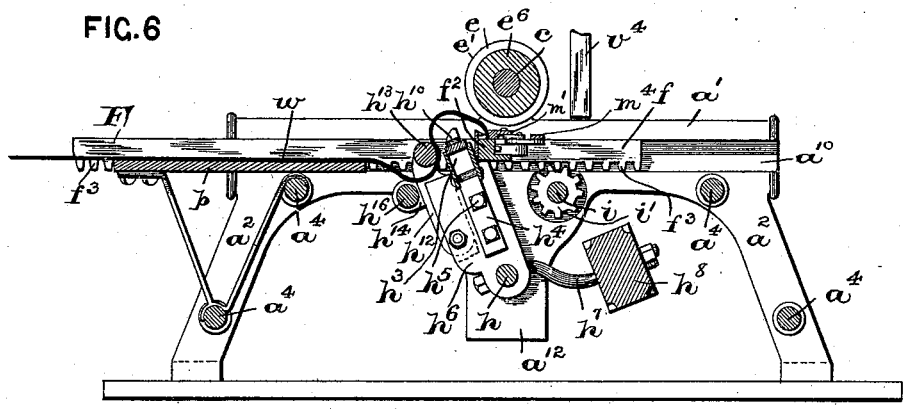
Figure 8:
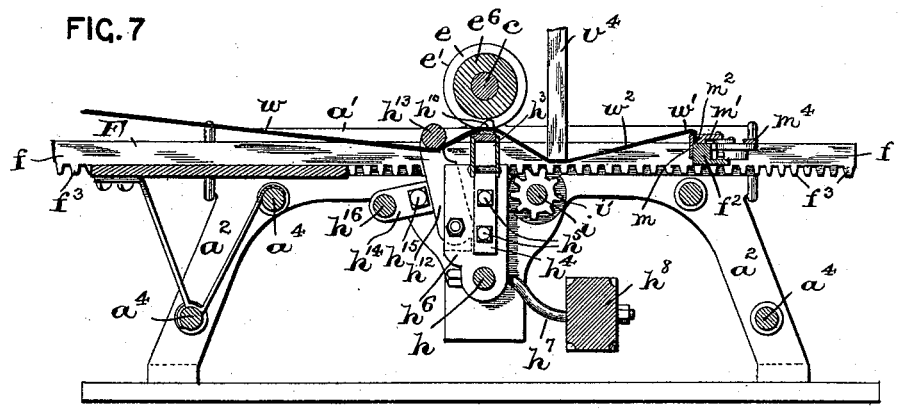
Figure 9:
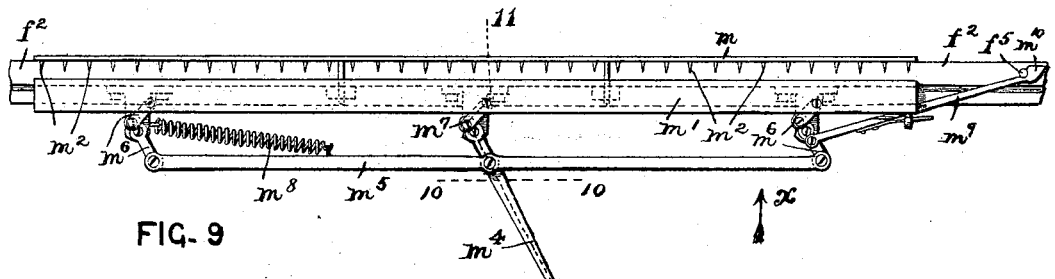
Figure 10:
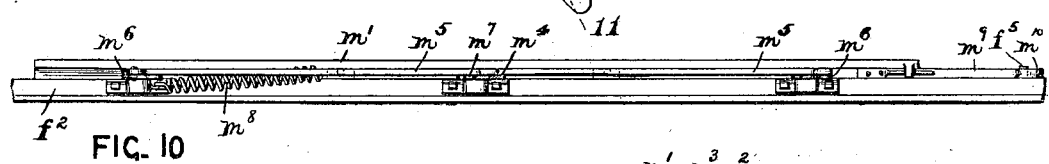
Figure 11:
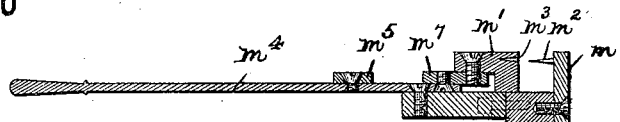
Figure 12:
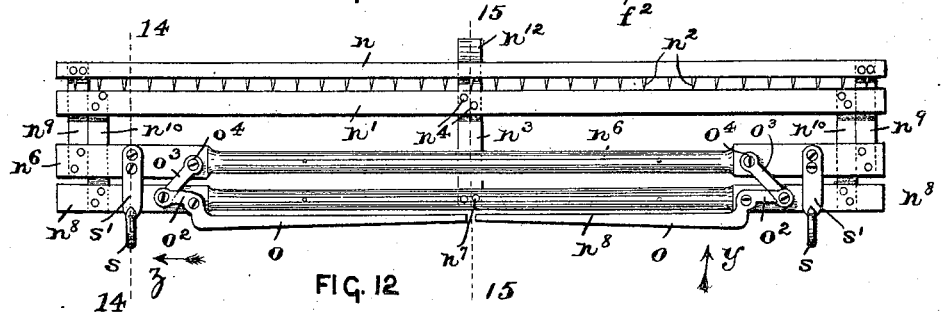
Figure 13:
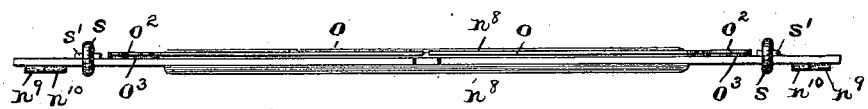
Figure 14:
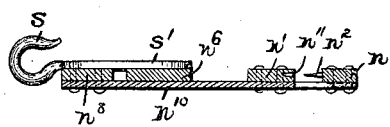
Figure 15:
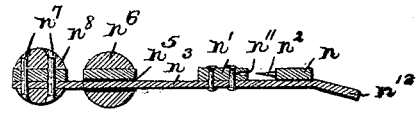
Figure 16:
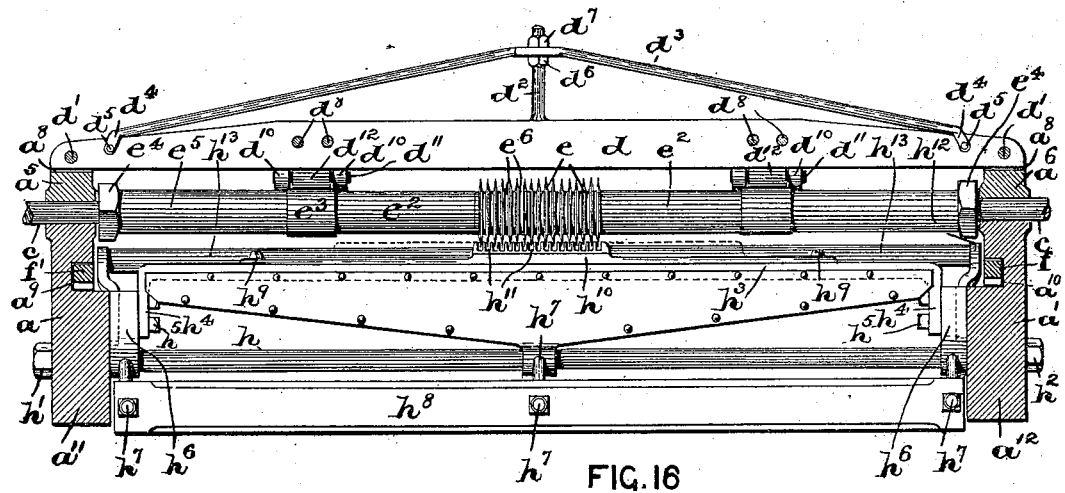
Figure 17:
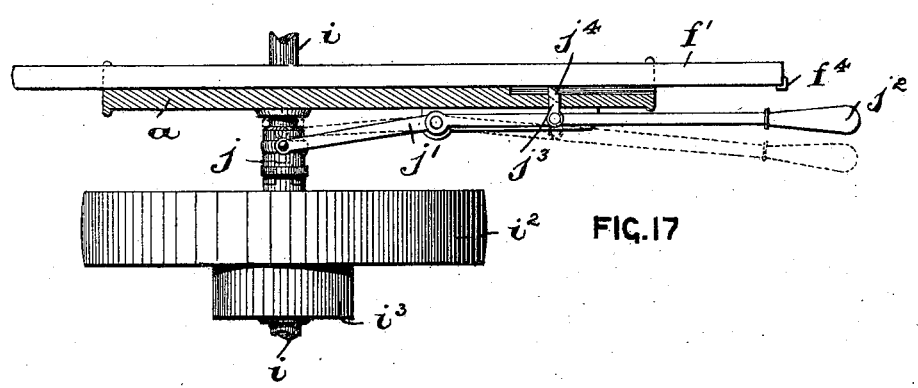

Figure 1 is a plan view of one form of machine for cutting laces or the like embodying the principles of our invention. Fig. 2 is a side view of the machine, illustrating in connection therewith an arrangement of pulley-wheels and belts for operating the machine; and Fig. 3 is an end view of the machine. Fig. 4 is a detail view of part of the cutter and cutter-bar frame with some of the cutters and certain sleeves on the cutter-bar represented in vertical section; and Fig. 5 is a cross-section of the same, taken on line 5 5 in Fig. 4. Figs. 6 and 7 are longitudinal vertical sections of the main portion of the machine, illustrating the different steps of securing a skin or hide or other suitable material in a clamping or clutching mechanism connected with the traveling carriage or frame of the machine. Fig. 8 is a longitudinal vertical section of the same parts of the machine illustrated in Figs. 6 and 7, showing the manner of passing the skin or hide or other material to be cut beneath the rotary cutters to form the narrow strips or laces. Fig. 9 is a plan view of said clamping or holding mechanism, illustrated in Figs. 6, 7, and 8, for holding or clutching the one end of the material; and Fig. 10 is an end view of the same, looking in the direction of the arrow $x$ in Fig. 9, and the operating-lever shown in said Fig. 9 in this view being represented in cross-section, said section being taken on line 10 in said Fig. 9. Fig. 11 is a vertical section of the said parts on an enlarged scale, said section being taken on line 11 in said Fig. 9. Fig. 12 is a plan view of a holding-frame to which the other end of the hide or skin or other material is attached for the purpose of holding the material taut during the cutting operation and properly guiding it beneath the rotary cutters of the machine. Fig. 13 is an end view of the said holding-frame, looking in the direction of the arrow $y$ in Fig. 12. Fig. 14 is a vertical section taken on line 14 in Fig. 12, looking in the direction of arrow $z$; and Fig. 15 is a similar section taken on line 15 in said Fig. 12. Fig. 16 is a vertical cross-section of the machine, taken on line 16 in Fig. 1, illustrating the cutters, cutter-bar, and frame, and a pivoted cutting-table, all in front elevation. Fig. 17 is a detail view of a pair of operating-pulleys and automatic clutch, operated by contact with the end of the traveling frame or carriage, moving in ways or guides in the machine-frame to cause the reverse movements of the several parts of the machine after the hide or skin or other material has been cut into strips or laces.

Similar letters of reference have been employed in all of the above-described views to indicate like parts.

Our novel form and construction of machine is especially designed for the cutting of skins or hides, at one operation, into narrow strips for shoe-laces; but it will be evident from the following description that the distances between any two consecutively-arranged cutters may be increased for cutting skins into straps or for cutting any other suitable material, such as cloth or paper, into strips of any desirable width.

By the novel arrangement and construction of the several parts of mechanism comprising the machine herein shown and described all laces or strips are perfectly formed and are of uniform width, being made in considerably less time than can be done by hand, and hence there is a great saving in the cost of manufacture of shoe-laces made from leather.

In said above-described views, A represents the complete cutting-machine, which consists, essentially, of two side frames $a$ and $a'$, provided with suitable supports or legs $a^2$, having perforated flanges $a^3$ for fastening the said frame-pieces to stout supports $b$, of wood, or when said supports or legs $a^2$ are made long enough they can be directly secured to the floor. Said frame-pieces $a$ and $a'$ are connected by suitable tie-rods $a^4$, as will be seen from Figs. 1, 2, 3, 6, 7, and 8 of the drawings. On the upper portions of said frame-pieces are suitable bearings $a^5$ and $a^6$, secured in place by means of bolts $a^7$, and rotatively arranged in said bearings is a cutter-shaft $c$, held in its operative position in said bearings by means of suitable collars $c'$ and $c^2$, secured, by means of pins $c^3$ and $c^4$, on opposite sides of the bearings $a^5$ and $a^6$, as will be more especially seen from an inspection of Fig. 4; but of course it will be evident that any other well-known means for holding said shaft in its operative position in the bearings may be used. The upper portion of each bearing $a^5$ and $a^6$ is slotted, as at $a^8$, (see Figs. 1, 3, 4, and 16,) and secured in said slotted parts by means of bolts $d'$, passing through perforations in the several parts, is a frame or bar $d$. Said bar $d$ is provided with a post $d^2$, which is screw-threaded at the top and has fitted thereon a tie-rod or truss-beam $d^3$, the ends $d^4$ of which are secured, by means of pins or bolts $d^5$, to the frame or bar $d$, substantially as shown. On said post $d^2$ are two nuts $d^6$ and $d^7$, one below and the other above said beam or truss $d^3$. Secured on the opposite sides of said bar or frame $d$, as will be seen from Figs. 1, 2, 3, 4, and 5, by means of the bolts $d^8$, are suitable plates $d^9$, each being provided with a pair of perforated lugs or ears $d^{10}$, in which are arranged on the pins $d^{11}$ small rollers $d^{12}$, substantially as shown in said Figs. 4 and 5. As will be noticed from an inspection of Figs. 4 and 16, we may provide said shaft $c$ with any desirable number of cutters $e$, having the sharp cutting edges $e'$, which are arranged and secured on said shaft, as shown in said figures, by means of sleeves $e^2$ at the opposite ends of the cutters, the rollers $e^3$ on said shaft being in frictional engagement with said small rollers $d^{12}$, secured in position on the bar or frame $d$, and the purpose of which is to maintain the rigidity of said shaft $c$ during the cutting operation of the machine. Between suitable nuts $e^4$ on screw-threaded portions of said shaft $c$ and said rollers $e^3$ we have arranged the sleeves $e^5$. Between every two cutters $e$ are suitable washers or collars $e^6$, and when said nuts $e^4$ are tightly secured against the ends of the sleeves $e^5$, then the said cutters $e$ will be in their secure positions on the shaft $c$ and ready for use. On one end of said shaft $c$ is a pulley $g$, operated by a belt $g'$, which is made to pass over a driving-pulley $g^2$, as shown. Of course it will be understood that the hereinabove-described manner of securing the cutters $e$ on the shaft $c$ may be departed from and any other well-known means of fastening may be employed. Furthermore, the shaft $c$ may be operated in a different manner from that hereinabove described.

In the inner and opposite surfaces of the two frame-pieces $a$ and $a'$ are suitable grooves $a^9$ and $a^{10}$, (see more especially Figs. 6, 7, 8, and 16,) in which is movably arranged a traveling frame or carriage F. This frame is light in structure and the two side pieces $f$ and $f'$ thereof are secured at one end by a cross-bar $f^2$, to which is attached a suitable hide or skin clamping or holding mechanism, the construction and purpose of which will be more fully described hereinafter. The under sides of said pieces $f$ and $f'$ are provided with teeth $f^3$, as shown. As will be seen from the several figures of the drawings, said side frames $a$ and $a'$ are also provided with downwardly-extending bearing portions $a^{11}$ and $a^{12}$, having holes which form bearings, and in which is arranged a bolt or tie-rod $h$, having a head $h'$ on one end and a nut $h^2$ on the opposite end. Pivotally arranged on said bolt or bar $h$ is a flat cutting-table, which consists, essentially, of the main frame $h^3$, having downwardly-extending arms $h^4$ at its free ends. Said arms $h^4$ are fastened by means of bolts $h^5$ to certain parts or arms $h^6$, which are pivotally arranged on the bolt or bar $h$. Connected with the said parts $h^6$ and with the frame $h^3$ of the cutting-table are suitable rods $h^7$, and secured to the ends of said rods is a heavy weight $h^8$, extending across the width of the machine-frame, and which is for the purpose of causing the cutting-table to assume its normally upright and operative position directly underneath the cutting edges of the cutters $e$ and holds said table in a fixed or stationary position while the machine is being operated, substantially as illustrated in Figs. 6 and 8. Secured on the top of said table or frame $h^3$, by means of screws $h^9$, or in any other suitable manner, is a plate $h^{10}$, having the cross saw cuts or grooves $h^{11}$ in its upper surface directly opposite and comparatively close to the cutting edges of the cutters $e$. The grooved portions $h^{11}$ of said plate $h^{10}$ may be made of any desirable lengths, and upon the shaft $c$ we may arrange any suitable number of cutters, corresponding to the number of saw cuts or grooves in said plate $h^{10}$, and said plate can be quickly replaced by a second plate, according to whether the operator desires to cut a narrow or a wide skin or hide into narrow strips or laces. Thus it will be evident that for narrow skins a smaller number of cutters $e$ and saw cuts $h^{11}$ are employed and for a wide skin a larger number of cutters $e$ and saw cuts $h^{11}$ are used, and there is no danger of cutting and wasting the irregular side portions of the skin, which are used for other purposes. Pivotally connected with said parts $h^6$ on the bolt or bar $h$ are a pair of arms $h^{12}$, having a connecting cross bar or rod $h^{13}$. A second pair of arms $h^{14}$ are secured by means of bolts $h^{15}$ to said bearing portions $a^{11}$ and $a^{12}$, and said arms are connected by a cross bar or rod $h^{16}$. As will be seen from the several figures of the drawings, said bearing portions $a^{11}$ and $a^{12}$ are provided with bearing portions in which is rotatively arranged a shaft $i$, to which are secured the pinions $i'$, which mesh with the teeth $f^3$ on the under sides of the frame-pieces $f$ and $f'$ of the traveling frame or carriage F, as will be clearly evident. As will be seen from Figs. 1 and 3, on the one end of said shaft $i$ is a suitable clutch mechanism $j$, adapted to be made to engage with a loose pulley $i^2$ on said shaft $i$, for the purposes hereinafter stated, and $i^3$ is a fast pulley on said shaft.

Connected with the clutch mechanism is the forked end of a lever $j'$, pivotally attached to the main frame of the machine. When the carriage F is to travel forwardly in the direction of the arrow $x'$, (see Fig. 1,) then said lever $j'$ and its clutch mechanism $j$ are in the positions indicated in said Fig. 1 and also in Fig. 17, having been forced into this position by pressure of the hand of the operator on the handpiece $j^2$, and the crossed belt $k$, moving over the pulley $k'$ on the main driving-shaft, will therefore operate the shaft $i$ and pinions $i'$ thereon, and in consequence will move the carriage or frame F forwardly on its ways or guides in the machine-frame. As soon as a projection $f^4$ on the side piece $f$ of said frame F comes in contact with a chamfered edge $j^4$ of a finger or post $j^3$ on the lever $j'$ the latter assumes the dotted position indicated in said Fig. 17, and the clutch mechanism $j$ is disengaged from its operative contact with the pulley $i^2$ on the shaft $i$ and the machine ceases its cutting operation. In order to cause the return of the carriage F and to bring the other parts of the machine into their operative positions just prior to receiving a skin or hide or other material to be cut, the operator places his foot upon a foot-lever $l$, (see Figs. 1 and 2,) and by means of a chain $l'$ or other suitable connection he raises a weight $l^2$ on an arm $l^3$ from the position indicated in Fig. 2 to the dotted position in said same figure. This movement causes a belt-tightening device $l^4$ to tighten the loose belt $l^5$, which passes over a driving-pulley $l^6$, and in consequence operates the pulley $i^3$ on the shaft $i$. This pulley being made to rotate in the opposite direction from the loose pulley $i^2$ on said shaft $i$, the frame F now moves in the direction of arrow $x^2$, as indicated in Figs. 1 and 6. Previous to this operation of the machine, however, that is, before the operator presses the foot-lever $l$, he pulls the rod $h^{13}$ back against the rod $h^{16}$ (see Fig. 6) and inserts the one end of the hide or skin or other material to be cut between said bars or rods $h^{13}$ and $h^{16}$, and then presses the foot-lever $l$ in the manner hereinabove stated. This action causes the return of the traveling carriage or frame F, and as soon as the cross-bar $f^2$ in said carriage comes in contact with the pivotally-arranged cutting table or frame $h^3$ the latter is forced from its previously-tilted position (illustrated in Fig. 6) to that shown in Fig. 7. At the same time the operator has removed his foot from the foot-lever $l$, which disengages the belt-tightener $l^4$ from the belt $l^5$, and said belt again slips over the surface of the pulley $l^3$, while the several parts of the machine remain in their inoperative positions. (Illustrated in Fig. 7.) The end of the hide, skin, or other material to be cut is now placed between two parallel bars or rods $m$ and $m'$, one of which, as $m$, is fastened to the cross-bar $f^2$ on the frame F and is provided with needle-points $m^2$ or other suitable holding means, while the other bar, $m'$, is capable of a sliding movement on said bar $f^2$, and is provided with suitable holes or recesses $m^3$, adapted to be brought directly over said needle-points $m^2$. When the hide or skin is placed between said parallel bars $m$ and $m'$, the operator reaches over the bar $d$ and pulls on a lever $m^4$, pivotally attached to the rod or bar $m^5$, which operates a system of toggle-levers $m^6$ and also the lever or arm $m^7$, being assisted by the action of a stout spring $m^8$ to bring the bar $m'$ tightly against the bar $m$, with the skin or hide securely fastened between said bars by being impaled on the needle-points $m^2$. When the several parts of this holding or clutching device are in their separated positions to receive the end of a skin or hide, a rod $m^9$ is employed having a hooked end $m^{10}$, which is engaged by a pin $f^5$ on the bar $f^2$ to hold said parts in their separated positions; but as soon as the lever $m^4$ is operated, then the sudden jerk disengages the hooked end of said rod $m^9$ from the pin $f^5$ and the bars $m$ and $m'$ can be tightly closed against each other.

The construction and operation of the several parts of the said holding or clutching device will be clearly understood from an inspection of Figs. 9 and 11.

The operator next clamps the opposite end of the skin or hide between two parallel bars $n$ and $n'$ of the holding or clutching frame or device. (Illustrated in Figs. 12, 13, 14, and 15.) Said device comprises therein a bar $n$, having needle-points $n^2$, and the bar or piece $n^3$, which is secured, as at $n^4$, to said bar $n'$. Said bar or piece $n^3$ passes through an opening $n^5$ in a cross piece or bar $n^6$, and is secured, as at $n^7$, to a similar cross piece or bar $n^8$. The bars $n$ and $n^6$ are connected by end pieces $n^9$, and the bars $n'$ and $n^8$ are likewise connected by the end pieces $n^{10}$. Pivotally secured to said bar $n^8$ are two levers $o$, each of which has a projecting arm $o^2$, and to each of said arms is pivotally attached a link $o^3$, operatively connected with the bar $n^6$, as at $o^4$. Thus it will be evident that when the levers $o$ are thrown back the lever connections connected therewith will cause the bars $n$ and $n'$ to become separated. When the end of the skin or hide has been placed between these bars and the levers $o$ have been brought to the positions indicated in Fig. 12, then the needle-points $n^2$ are forced through the skin or hide and each point enters a recess or perforation $n^{11}$ in the bar $n'$. The clamping-frame illustrated in Fig. 12 is independent of the main construction of the machine and generally rests upon a table or bench $p$, on which the operator can quickly manipulate said frame and secure the end of the hide or skin or other material to be cut between the two holding-bars of said frame. When the hide or skin has been secured to this frame in the manner just described, a pair of rings $r$ on a skin stretching or holding device are arranged over the hooked ends $s$ of certain pieces of plates $s'$, secured to the bar $n^6$. Connected with each ring $r$ is a belt or strap $r'$, which passes over a wheel or roller $t$ in the framework $u$, and weights $r^2$ on the ends of said straps $r'$ hold the same tight and the skin or hide taut during the cutting operation, as will be clearly evident from an inspection of Figs. 1 and 2. To produce additional friction upon the straps $r'$ and thereby help to hold the skin or hide very taut, we have pivotally arranged on a pin $t'$ in each wheel or roller-frame $t^2$ on said framework $u$ a weighted rod $t^3$, having a jaw $t^4$, which, as will be seen, exerts great pressure upon the surface of the strap and thereby adds in helping to maintain the skins or hides taut during the cutting operation. The operator now works the lever $j'$ to throw the clutch mechanism $j$ into its operative engagement with the loose pulley $i^2$ on the shaft $i$, having, of course, previously started the cutter-shaft. Immediately the carriage or frame F moves forwardly, taking the end $w'$ of the hide $w$ beneath the cutters $e$, (see Fig. 6,) while at the same time the weight $h^8$, hereinabove mentioned, brings the table or frame $h^3$ to its upright position, with the saw cuts $h^{11}$ directly underneath the rapidly-revolving cutters $e$, as shown in Fig. 8, and the skin or hide will be cut into long and narrow strips or laces, as will be clearly evident.

During the cutting operation the holding or clutching frame illustrated in Fig. 12 is gradually drawn toward the revolving cutters until the end $n^{12}$ on the bar $n^3$ is brought directly against the edge of the cutting-table $h^3$. This operation causes the separation of the two bars or rods $n$ and $n'$, and while said clamping device falls down upon the table or bench $p$ the skin or hide $w$ is finally passed under the cutters and comes out from the opposite side of the machine as a heading $w'$, attached to the holding device on the bar $f^2$ of the traveling carriage or frame F, with the laces or strips $w^2$ dangling from said heading. At the same time the stop or projection $f^4$ on the frame F has caused the clutch mechanism $j$ to disengage the pulley $i^2$, and the operations of the several parts of the machine stop, when the carriage F can again be returned to its initial position by operating the foot-lever $l$ in the manner hereinabove described.

In Figs. 1, 2, and 3 is illustrated a device for keeping the narrow strips $w^2$ of the hide or skin taut after being cut by the cutters $e$ and exerting a direct downward pressure upon the cut parts of the skin to perfectly draw the uncut portion of the skin against the sharp edges of the cutters. In this manner any distortion of the skin or hide or other material to be cut is avoided and all the strips or laces formed will be of a uniform width. Said device consists, essentially, of a suitable frame $v$, having the side pieces $v'$ and a bottom piece $v^2$, as will be seen from Figs. 1 and 2. Said bottom piece $v^2$ is provided with a series of perforations or holes, and in each hole is loosely arranged a rod $v^3$, provided with a head or nut to prevent it from dropping out of said bottom piece $v^2$. Said rods $v^3$ terminate in comparatively long rectangular weights $v^4$, which bear upon the strips or cut portions $w^2$ of the skin or hide to maintain the tautness of said cut portions and to cause an even pull of the hide or skin against the cutting edges of the cutters $e$. Said frame and the weights connected therewith, in the manner just described, are suspended from a chain or rope $v^5$, which passes over a pulley $v^6$ and has a hook $v^7$ or other similar means for fastening the same to a post $v^8$ on the framework $u$, substantially as illustrated in Fig. 2. When the parts of the machine are in their inoperative positions, (illustrated more especially in Fig. 2,) then said chain or connection $v^5$ is attached to said post $v^8$; but as soon as the machine has been started and the cutting operation has begun then the hook $v^7$ is detached from said post $v^8$ and each weight $v^4$ is allowed to firmly bear against the upper surfaces of the cut strips or portions $w^2$ of the hide or skin as they pass beneath said parts, for the purposes hereinabove set forth. In order to prevent the oscillation of the said bars or weights $v^4$ during the operation of the several parts of the machine, said weights are movably arranged in a suitable frame $v^9$, secured in any desirable manner to the frame of the machine. From the above description it will be seen that a simply constructed and operative machine for the purposes stated has been devised, and one which is operative in all respects and is especially adapted for cutting hides or skins into long and narrow strips for shoe-laces. The saw cuts on the cutting-table, as well as the cutters, are removably arranged, so that any desired number of these parts can be used for cutting hides or skins of different widths without wasting the irregular side portions of the skin or hide.

Of course it will be understood that the precise arrangements and forms of the several parts of mechanism herein shown are not essential to the present invention, and they may be varied without departing from the scope of the invention. Hence we do not limit ourselves to the exact arrangements and combinations of the parts as herein shown and described.

Having thus described our invention, what we claim is—

1. In a machine for cutting leather or other material into strips or laces, the combination, of a machine-frame, cutters arranged on a shaft in bearings on said frame, and a flat cutting-table pivotally arranged in said frame, and having a weight to normally force said table in its operative position beneath said cutters, and hold the same in a fixed and stationary position, during the cutting operation, substantially as and for the purposes set forth.

2. In a machine for cutting leather or other material into strips or laces, the combination, of a machine-frame, cutters arranged on a shaft in bearings on said frame, and a flat cutting-table pivotally arranged in said frame, cross cuts or grooves in its upper surface, and a weight connected with said table to normally force it in its operative position beneath said cutters, and hold the same in a fixed and stationary position, during the cutting operation, substantially as and for the purposes set forth.

3. In a machine for cutting leather or other material into strips or laces, the combination, of a machine-frame, cutters arranged on a shaft in bearings on said frame, a rod, as $h$, arms $h^6$ pivotally arranged on said rod, a flat cutting table or frame secured to said arms, and means for normally forcing said arms and the cutting table or frame in an operative position beneath said cutters, and hold the same in a fixed and stationary position, during the cutting operation, substantially as and for the purposes set forth.

4. In a machine for cutting leather or other material into strips or laces, the combination, of a machine-frame, cutters arranged on a shaft in bearings on said frame, a rod, as $h$, arms $h^6$ pivotally arranged on said rod, a flat cutting table or frame secured to said arms, and a weight connected with said arms, for normally forcing said arms and the cutting table or frame in an operative position beneath said cutters, and hold the same in a fixed and stationary position, during the cutting operation, substantially as and for the purposes set forth.

5. In a machine for cutting leather or other material into strips or laces, the combination, of a machine-frame, cutters arranged on a shaft in bearings on said frame, a rod, as $h$, arms $h^6$ pivotally arranged on said rod, a flat cutting table or frame secured to said frame, cross cuts or grooves in the upper surface of said table, and means for normally forcing said arms and the cutting table or frame in an operative position beneath the cutters, and hold the same in a fixed and stationary position, during the cutting operation, substantially as and for the purposes set forth.

6. In a machine for cutting leather or other material into strips or laces, the combination, of a machine-frame, cutters arranged on a shaft in bearings on said frame, a rod, as $h$, arms $h^6$ pivotally arranged on said rod, a flat cutting table or frame secured to said frame, cross cuts or grooves in the upper surface of said table, and a weight connected with said arms, for normally forcing said arms and the cutting table or frame in an operative position beneath the cutters, and hold the same in a fixed and stationary position, during the cutting operation, substantially as and for the purposes set forth.

7. In a machine for cutting leather or other material into strips or laces, the combination, of a machine-frame, a horizontally-moving frame or carriage, cutters arranged on a shaft in bearings on said machine, and a cutting table or frame pivotally arranged in said machine-frame, having a weight to normally force said table or frame in its operative position beneath said cutters, substantially as and for the purposes set forth.

8. In a machine for cutting leather or other material into strips or laces, the combination, of a machine-frame, a horizontally-moving frame or carriage, cutters arranged on a shaft in bearings on said machine, and a cutting table or frame pivotally arranged in said machine-frame, cross cuts or grooves in its upper surface, and a weight connected with said table or frame to normally force it in its operative position beneath said cutters, substantially as and for the purposes set forth.

9. In a machine for cutting leather or other material into strips or laces, the combination, of a machine-frame, a horizontally-moving frame or carriage, cutters arranged in bearings on said machine, a rod, as $h$, arms $h^6$ pivotally arranged on said rod, a cutting table or frame secured to said arms, and means for normally forcing said arms and the cutting table or frame in an operative position be- 10. In a machine for cutting leather or other material into strips or laces, the combination, of a machine-frame, a horizontally-moving frame or carriage, cutters arranged in bearings on said machine, a rod, as $h$, arms $h^6$ pivotally arranged on said rod, a cutting table or frame secured to said arms, and a weight connected with said arms, for normally forcing said arms and the cutting table or frame in an operative position beneath said cutters, substantially as and for the purposes set forth.

11. In a machine for cutting leather or other material into strips or laces, the combination, of a machine-frame, a horizontally-moving frame or carriage, cutters arranged in bearings on said machine, a rod $h$, arms $h^6$ pivotally arranged on said rod, a cutting table or frame secured to said arms, cross cuts or grooves in the upper surface of said table or frame, and means for normally forcing said arms and the cutting table or frame in an operative position beneath said cutters, substantially as and for the purposes set forth.

12. In a machine for cutting leather or other material into strips or laces, the combination, of a machine-frame, a horizontally-moving frame or carriage, cutters arranged in bearings on said machine, a rod, as $h$, arms $h^6$ pivotally arranged on said rod, a cutting table or frame secured to said arms, cross cuts or grooves in the upper surface of said table or frame, and a weight connected with said arms, for normally forcing said arms and the cutting table or frame in an operative position beneath said cutters, substantially as and for the purposes set forth.

13. In a machine for cutting leather or other material into strips or laces, the combination, of a machine-frame, cutters arranged on a shaft in bearings on said frame, a rod, as $h$, arms $h^6$, pivotally arranged on said rod, a frame $h^{14}$ $h^{16}$ on said arms, a pivotally-arranged frame $h^{12}$ $h^{13}$ on said arms, and a cutting table or frame, and means for normally forcing said table or frame in an operative position beneath said cutter, substantially as and for the purposes set forth.

14. In a machine for cutting leather or other material into strips or laces, the combination, of a machine-frame, cutters arranged on a shaft in bearings on said frame, a rod, as $h$, arms $h^6$ pivotally arranged on said rod, a frame $h^{14}$ $h^{16}$ on said arms, a pivotally-arranged frame $h^{12}$ $h^{13}$ on said arms, a cutting table or frame, and a weight connected with said arms $h^6$, for normally forcing said arms and the cutting table or frame in an operative position beneath said cutters, substantially as and for the purposes set forth.

15. In a machine for cutting leather or other material into strips or laces, the combination, of a machine-frame, a horizontally-moving carriage or frame, cutters arranged on a shaft in bearings on said machine, a rod, as $h$, arms $h^6$ pivotally arranged on said rod, a frame $h^{14}$ $h^{16}$ on said arms, a pivotally-arranged frame $h^{12}$ $h^{13}$ on said arms, and a cutting table or frame, and means for normally forcing said table or frame in an operative position beneath said cutters, substantially as and for the purposes set forth.

16. In a machine for cutting leather or other material into strips or laces, the combination, of a machine-frame, a horizontally-moving carriage or frame, cutters arranged on a shaft in bearings on said machine, a rod, as $h$, arms $h^6$ pivotally arranged on said rod, a frame $h^{14}$ $h^{16}$ on said arms, a pivotally-arranged frame $h^{12}$ $h^{13}$ on said arms, a cutting table or frame, and a weight connected with said arms for normally forcing said arms and the cutting table or frame in an operative position beneath said cutters, substantially as and for the purposes set forth.

17. In a machine for cutting leather or other material into strips or laces, the combination, of a machine-frame, a horizontally-moving frame or carriage, means connected therewith, for attaching the one end of the material to be cut to said frame or carriage, cutters arranged on a shaft in bearings in the frame of the machine, and a cutting-table pivotally arranged beneath said cutters and provided with means for normally forcing said table in an operative position beneath said cutters, substantially as and for the purposes set forth.

18. In a machine for cutting leather or other material into strips or laces, the combination, of a machine-frame, a horizontally-moving frame or carriage, means connected therewith, for attaching the one end of the material to be cut to said frame or carriage, consisting, essentially, of parallel bars or rods $m$ and $m'$, one provided with needle-points and the other with correspondingly-arranged holes or recesses, and a system of levers for operating said parallel bars, cutters arranged on a shaft in bearings on the frame of the machine, and a cutting table or frame pivotally arranged beneath said cutters and provided with means for normally forcing said table or frame in an operative position beneath said cutters, substantially as and for the purposes set forth.

19. In a machine for cutting leather or other material into strips or laces, the combination, of a machine-frame, a shaft in bearings on said frame, cutters removably arranged on said shaft, a flat cutting table or frame pivotally connected with said machine-frame, means for normally forcing said table or frame into its operative position beneath said cutters, and hold the same in a fixed and stationary position, during the cutting operation, and a grooved plate detachably secured on said cutting table or frame, substantially as and for the purposes set forth.

20. In a machine for cutting leather or other material into strips or laces, the combination, of a machine-frame, a shaft in bearings on said frame and having cutters, a bar or frame $d$ secured to said bearings, rollers $e^3$ on said shaft, plates $d^9$ on said bar $d$ provided with perforated ears or lugs, rollers $d^{12}$ between said ears adapted to engage with said rollers $e^3$, a flat cutting-table beneath said cutters, and means connected with said table for forcing the same into its operative position beneath said cutters and hold said table in a fixed and stationary position, during the cutting operation, substantially as and for the purposes set forth.

21. In a machine for cutting leather or other material into strips or laces, the combination, of a machine-frame, a shaft in bearings on said frame and having cutters, a bar or frame $d$ secured to said bearings, rollers $e^3$ on said shaft, plates $d^9$ on said bar $d$ provided with perforated ears or lugs, rollers $d^{12}$ between said ears adapted to engage with said rollers $e^3$, and a flat cutting-table pivotally arranged in said machine-frame, having a weight to normally force said table in its operative position beneath said cutters, and hold the same in a fixed and stationary position during the cutting operation, substantially as and for the purposes set forth.

22. A clutching or holding frame, comprising therein, a pair of parallel bars $n$ and $n'$, one having needle-points and the other correspondingly-arranged holes or recesses, bars $n^6$ and $n^8$, and connecting-bars $n^9$ and $n^{10}$ and $n^3$, a pair of levers $o$ pivotally arranged on said bar $n^8$, and links $o^3$ connecting said levers with said bar $n^6$, all, substantially as and for the purposes set forth.

23. A clutching or holding frame, comprising therein, a pair of parallel bars $n$ and $n'$, one having needle-points and the other correspondingly-arranged holes or recesses, bars $n^6$ and $n^8$, and connecting-bars $n^9$ and $n^{10}$ and $n^3$, a pair of levers $o$ pivotally arranged on said bar $n^8$, and links $o^3$ connecting said levers with said bar $n^6$, in combination, with a traveling carriage or frame, cutting-table, and cutters of a machine for cutting leather or other material into strips or laces, and belts or straps $r'$ connected with said bars $n^6$, passing over pulleys, and weights on the ends of said straps, substantially as and for the purposes set forth.

24. A clutching or holding frame, comprising therein, a pair of parallel bars $n$ and $n'$, one having needle-points and the other correspondingly-arranged holes or recesses, bars $n^6$ and $n^8$, and connecting-bars $n^9$ and $n^{10}$ and $n^3$, a pair of levers $o$ pivotally arranged on said bar $n^8$, and links $o^3$ connecting said levers with said bar $n^6$, in combination, with a traveling carriage or frame, cutting-table, and cutters of a machine for cutting leather or other material into strips or laces, belts or straps $r'$ connected with said bars $n^6$, passing over pulleys, weights on the ends of said straps, and friction devices in engagement with said straps, substantially as and for the purposes set forth.

25. In a machine for cutting leather or other material into strips or laces, the combination, of a machine-frame, a frame or carriage F movable horizontally in ways in the frame of the machine, teeth on said frame or carriage, pinions meshing with said teeth, and means for operating the same, cutters arranged on a shaft in bearings on said machine-frame, and a cutting table or frame pivotally arranged in said frame, and having a weight to normally force said table in its operative position beneath said cutters, substantially as and for the purposes set forth.

26. In a machine for cutting leather or other material into strips or laces, the combination, of a machine-frame, a frame or carriage F movable horizontally in ways in the frame of the machine, teeth on said frame or carriage, a shaft $i$, pinions $i'$ meshing with said teeth, a loose pulley $i^2$ on said shaft, and a clutch mechanism for operatively connecting said pulley with said shaft $i$, a shaft $c$ in the machine-frame, cutters thereon, and a cutting-table pivotally arranged in said frame, having a weight to normally force said table in its operative position beneath said cutters, substantially as and for the purposes set forth.

27. In combination with the cross-bar $f^2$ of the carriage or frame F, and a finger $f^5$ on said bar, a clutching or holding device, comprising therein, a pair of parallel bars $m$ and $m'$, means on said bars for clamping or holding a piece of material therebetween, links $m^6$ connected with said bar $m'$, a bar $m^5$, a lever $m^4$ pivoted to said bar $m^5$, a rod $m^9$ provided with a hook-shaped end, and a spring $m^8$, all arranged, substantially as and for the purposes set forth.

28. In a machine for cutting skins or other material into strips or laces, the combination, with a main frame, cutters arranged on a shaft in bearings in said frame, a reciprocally-moving carriage or frame, and a tension or spreading device operatively arranged above the material secured in said traveling frame or carriage, comprising therein, a series of vertically suspended and movable rods adapted to bear on the cut material, substantially as and for the purposes set forth.

29. In a machine for cutting leather or other material into strips or laces, the combination, with a main frame, cutters arranged on a shaft in bearings in said frame, a reciprocally-moving carriage or frame, and a tension or spreading device, consisting, essentially, of an open frame $v'$ $v^2$, having holes or perforations, rods $v^3$ in said holes, and weights $v^4$ on said rods, adapted to be brought into contact with the cut portions of the material, substantially as and for the purposes set forth.

30. In a machine for cutting leather or other material into strips or laces, the combination, with a main frame, cutters arranged on a shaft in bearings in said frame, a reciprocally-moving carriage or frame, and a tension or spreading device, consisting, essentially, of an open frame $v'$ $v^2$, having holes or perforations, rods $v^3$ in said holes, weights $v^4$ on said rods, adapted to be brought into contact with the cut portions of the material, and means for suspending said device above the material, consisting of a post $v^8$ on the frame of the machine, and a connection $v^5$ connected with said post and the said tension device and passing over a
5 pulley $v^6$, all arranged, substantially as and for the purposes set forth.

In testimony that we claim the invention set forth above we have hereunto set our hands this 25th day of November, 1895.

PHILIP GOLDSTEIN.
    GUSTAV ANDRAE.

Witnesses:
 FREDK. C. FRAENTZEL,
 WM. H. CAMFIELD, Jr.